US006735693B1

(12) United States Patent
Hamlin

(10) Patent No.: US 6,735,693 B1
(45) Date of Patent: May 11, 2004

(54) DISK DRIVE COMPRISING ENCRYPTION CIRCUITRY SELECTIVELY ENABLED BY VERIFYING A CIRCUIT THAT PROVIDES PLAINTEXT DATA

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/493,754

(22) Filed: Jan. 28, 2000

(51) Int. Cl.$^7$ ............................................ H04L 9/00
(52) U.S. Cl. ..................... 713/168; 713/189; 713/200; 380/29; 380/277; 705/51; 705/57
(58) Field of Search ................................ 713/200, 187, 713/189.168; 714/718; 380/4, 25, 49, 29, 277, 45; 705/51, 57

(56) References Cited

U.S. PATENT DOCUMENTS

| | | | |
|---|---|---|---|
| 5,595,555 A | 1/1997 | Chen | 380/49 |
| 5,687,237 A | 11/1997 | Naclerio | 380/29 |
| 5,734,819 A | 3/1998 | Lewis | 713/200 |
| 5,857,025 A | 1/1999 | Anderson et al. | 380/28 |
| 5,883,958 A | 3/1999 | Ishiguro et al. | 705/57 |
| 5,915,018 A | 6/1999 | Aucsmith | 380/201 |
| 5,920,690 A | 7/1999 | Moyer et al. | 713/200 |
| 5,931,947 A | 8/1999 | Burns et al. | 713/201 |
| 6,035,429 A * | 3/2000 | Shafe' | 714/718 |
| 6,088,802 A * | 7/2000 | Bialick et al. | 713/200 |
| 6,546,489 B1 * | 4/2003 | Frank et al. | 713/187 |

OTHER PUBLICATIONS

Howard Goboff, "Security for a High Performance Commodity Storage Subsystem", School of Computer Science, Carnegie Mellon University, CMU-CS-99-160, Jul. 1999, pp. 171-178.

David Nagle and Joan Digney, "NASD-Implementation", http://www.pdl.cs.cmu.edu/NASD/, Nov. 19, 1998, 1-2, NASD at CMU.

David Nagle and Joan Digney, "NASD-Extreme NASD", http://www.pdl.cs.cmu.edu/NASD/highlights97.html Jun. 10, 1999, 1-6, NASD at CMU.

Bruce Schneier, "Applied Cryptography Second Edition: protocols, algorithms, and source code in C", 1996, 1-9 & 409-413, John Wiley & Sons, Inc., USA.

(List continued on next page.)

Primary Examiner—Emmanuel L. Moise
(74) Attorney, Agent, or Firm—Milad G. Shara, Esq.; Howard H. Sheerin, Esq.

(57) ABSTRACT

A disk drive comprising a disk for storing encrypted data is disclosed. The disk drive comprises a first circuit for providing plaintext data to a second circuit. The second circuit comprises controllable encryption circuitry for encrypting the plaintext data into the encrypted data. The controllable encryption circuitry comprises a data input, an enable input, and a data output. The second circuit further comprises a plaintext input for providing the plaintext data to the data input, an encrypted text output for providing the encrypted data from the data output, and a first control input for receiving a first device authentication signal for authenticating the first circuit. The second circuit comprises a first verification circuit, responsive to the first device authentication signal, for producing a first verification signal for use in controlling the enable input of the encryption circuitry to enable the encryption circuitry to provide the encrypted data via the encrypted text output.

16 Claims, 6 Drawing Sheets

OTHER PUBLICATIONS

Garth A. Gibson, David F. Nagle, Khalil Amiri, Fay W. Chang, Howard Gobioff, Erik Riedel, David Rochberg, and Jim Zelenka, "Filesystems for Network–Attached Secure Disks", Jul. 1997, 1–18, CMU–CS–97–118, School of Computer Science, Carnegie Mellon University, Pittsburgh, Pennsylvania 15213–3890.

Howard Gobioff, Garth Gibson, and Doug Tygar, "Security for Network Attached Storage Devices", Oct. 23, 1997, 1–18, CMU–CS–97–185, School of Computer Science, Carnegie Mellon University, Pittsburgh, PA 15213.

Hans Eberle, "A High–Speed DES Implementation For Network Applications", Technical Report 90, DEC System Research Center, Sep. 1992.

Tygar, J.D. and Yee, B.S., "Secure Coprocessors in Electronic Commerce Applications", Proceedings 1995 USENIX Electronic Commerce Workshop, 1995, New York.

* cited by examiner

DISK DRIVE COMPRISING ENCRYPTION CIRCUITRY SELECTIVELY ENABLED BY VERIFYING A CIRCUIT THAT PROVIDES PLAINTEXT DATA

BACKGROUND OF THE INVENTION

1. Field of the Invention

The present invention relates to disk drives comprising encryption circuitry. More particularly, the present invention relates to a disk drive comprising encryption circuitry selectively enabled by verifying a circuit that provides plaintext data.

2. Description of the Prior Art

Cryptosystems, such as disk drives employing cryptography, are typically secure as long as attackers cannot discover the secret keys used to encrypt and decrypt messages. Attackers use various cryptanalysis techniques to analyze a cryptosystem in an attempt to discover the secret keys, where the difficulty in discovering the secret keys generally depends on the amount of information available. The cryptosystem typically employs a public encryption algorithm (such as RSA, DES, etc.), therefore an attacker typically knows the encryption algorithm and has access to ciphertext (encrypted text). However, it is usually very difficult to discover the secret keys with this information alone because an attacker typically needs to perform various operations on the ciphertext with respect to the original plaintext (unencrypted text). A known cryptanalysis technique includes monitoring a cryptosystem to capture plaintext before it is encrypted so that it can be analyzed together with the ciphertext. Another cryptoanalysis technique includes performing a chosen plaintext attack by choosing the plaintext that is to be encrypted so as to expose vulnerabilities of a cryptosystem because the attacker can deliberately pick patterns helpful to analysis contributing to discovering the secret keys. This type of an attack can be defended against by requiring the individual clients accessing the cryptosystem to be authenticated. However, an attacker with direct access to a cryptosystem may attempt to circumvent such a requirement by tampering with the cryptosystem. Examples of tampering include inspecting, altering or replacing a component of the cryptosytem in order to force the encryption operation.

U.S. Pat. No. 5,374,819 (the '819 patent) discloses a software program executing on a CPU which provides system operation validation in order to prevent the software program from executing on unlicensed computer systems. The validation method requires reading a unique chip identifier (chip ID) stored in a system device, and a corresponding chip ID and an encrypted code stored in a non-volatile memory. The encrypted code, termed a message authentication code or MAC, is generated based on the chip ID using a secret key. The '819 patent relies on uncompromised secrecy of the secret key to prevent tampering which could circumvent the validation process.

The '819 patent is susceptible to a probing attacker attempting to discover the secret key by performing a chosen plain-text attack; for example, a probing attacker could tamper with the cryptosystem to generate chosen plaintext by modifying the chip ID stored in the non-volatile memory and then evaluate the resulting MAC generated by the encryption process. Further, a probing attacker could monitor the software program as it executes on the CPU in order to observe how the chosen plaintext is being encrypted using the secret key. If the secret key is discovered, the security of the system is compromised since the chip ID and corresponding MAC could be altered without detection.

There is, therefore, a need for a disk drive comprising a tamper resistant cryptosystem which is protected from an attacker employing chosen plaintext attacks.

SUMMARY OF THE INVENTION

The present invention may be regarded as a disk drive comprising a disk for storing encrypted data. The disk drive comprises a first circuit for providing plaintext data to a second circuit. The second circuit comprises controllable encryption circuitry for encrypting the plaintext data into the encrypted data. The controllable encryption circuitry comprises a data input, an enable input, and a data output. The second circuit further comprises a plaintext input for providing the plaintext data to the data input, an encrypted text output for providing the encrypted data from the data output, and a first control input for receiving a first device authentication signal for authenticating the first circuit. The second circuit comprises a first verification circuit, responsive to the first device authentication signal, for producing a first verification signal for use in controlling the enable input of the encryption circuitry to enable the encryption circuitry to provide the encrypted data via the encrypted text output.

The present invention may also be regard as a method of storing encrypted data to a disk. The method comprises the steps of receiving plaintext data from a first circuit, and receiving a first device authentication signal for authenticating the signal first circuit. A first verification signal is produced in response to the first device authentication signal, and encryption circuitry is enabled by the first verification signal to encrypt the plaintext data into the encrypted data. The encrypted data is then stored to the disk.

DESCRIPTION OF THE PREFERRED EMBODIMENTS

System Overview

Figure 1:
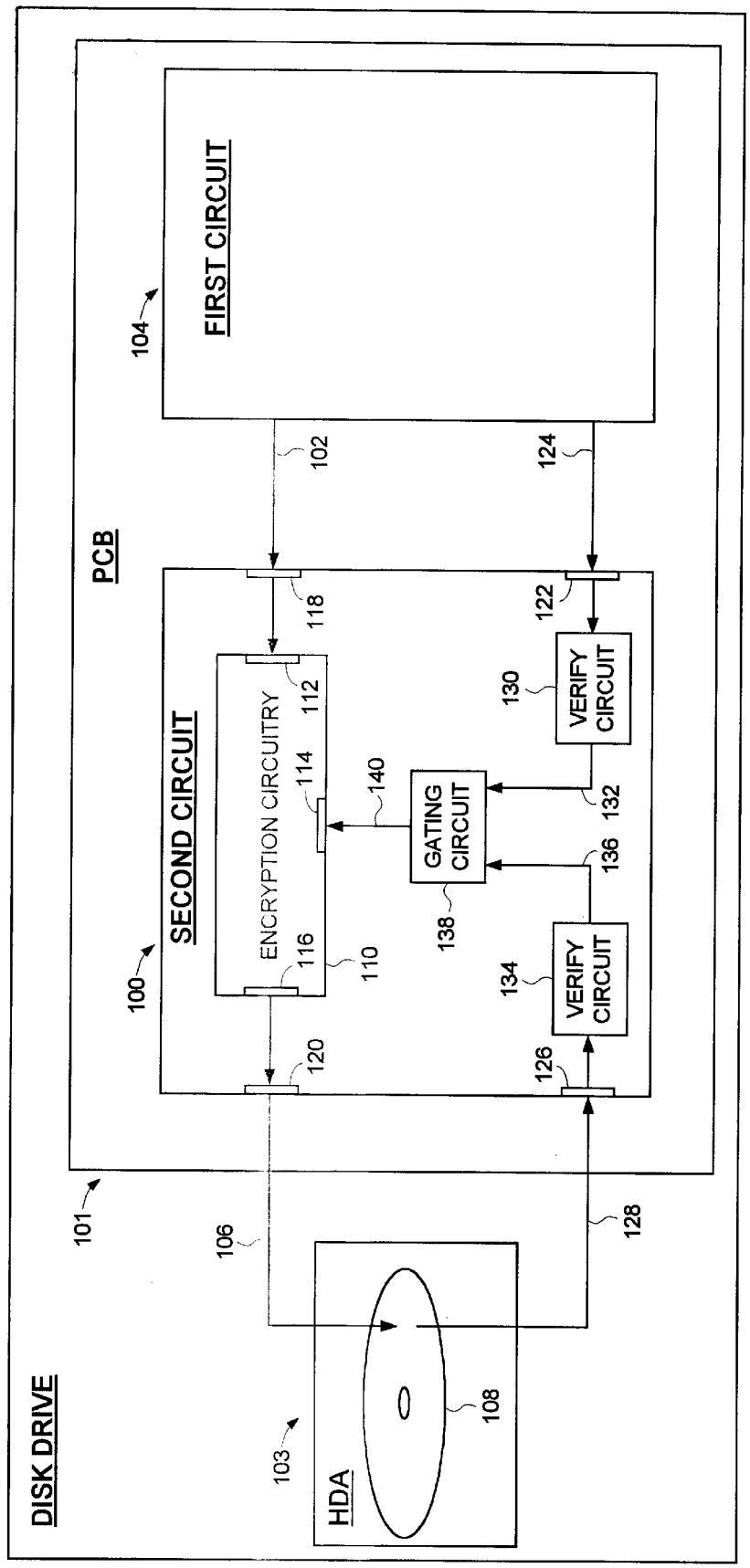
FIG. 1 shows a disk drive according to an embodiment of the present invention comprising a first circuit for providing plaintext data to a second circuit comprising an encryption circuit selectively enabled by a first device authentication signal generated by the first circuit, and a disk for storing the encrypted data from the integrated circuit.

FIG. 1 shows a disk drive according to an embodiment of the present invention comprising a first circuit 104 for providing plaintext data 102 to a second circuit 100 comprising encryption circuitry 110 for encrypting the plaintext data 102 to produce encrypted data 106 stored on a disk 108. The controllable encryption circuitry 110 comprises a data input 112, an enable input 114, and a data output 116. The second circuit 100 further comprises a plaintext input 118 for providing the plaintext data 102 to the data input 112, an encrypted text output 120 for providing the encrypted data 106 from the data output 116, and a first control input 122 for receiving a first device authentication signal 124 for authenticating the first circuit 104. A first verification circuit 130, responsive to the first device authentication signal 124, produces a first verification signal 132 for -use in controlling the enable input 114 of the encryption circuitry 110 to enable the encryption circuitry 110 to provide the encrypted data 106 via the encrypted text output 120.

In the embodiment shown in FIG. 1, the first and second circuits 104 and 100 are mounted on a printed circuit board (PCB) 101 and the disk 108 is housed in a head disk assembly (HDA) 103. The HDA 103 is hermetically sealed to protect against external particles from contaminating the surface of the disk 108.

The encryption circuitry 110 in the second circuit 100 will not operate unless the first circuit 104 has been verified which protects against a probing attacker tampering with the first circuit 104 in an attempt to perform a chosen plaintext attack. Further, the first circuit 104 will preferably not generate the first device authentication signal 124 unless a command to encrypt data is received by an authenticated client. This protects against an unauthenticated attacker attempting to observe the first device authentication signal 124. Additional protection against observation may be provided by concealing the first device authentication signal 124 to deter probing, or by detecting an attacker's probing by, for example, monitoring changes to the impedance of the first device authentication signal 124. In an alternative embodiment discussed below, a message authentication code (MAC) is employed to protect against a chosen plaintext attack in the event that an attacker is able to observe the first device authentication signal 124. In yet another embodiment, a means is provided to verify the validity of the firmware executed by the first circuit 104. For example, a CRC check code may be generated for the firmware during manufacturing which is then verified during operation before generating the first device authentication signal 124. This protects against a probing attacker who tampers with the executable code in an attempt to force the first circuit 104 to generate the first device authentication signal 124.

To provide further protection against a probing attacker, in one embodiment both the first and second circuits 104 and 100 are implemented using tamper-resistant encryption circuitry. An example discussion of tamper-resistant encryption circuitry is provided in Tygar, J. D. and Yee, B. S., "Secure Coprocessors in Electronic Commerce Applications," Proceedings 1995 USENIX Electronic Commerce Workshop, 1995, New York, which is incorporated herein by reference.

In another embodiment, the second circuit 102 comprises a second control input 126 for receiving a second device authentication signal 128 for authenticating the disk 108, and a second verification circuit 134 responsive to the second device authentication signal 128 for producing a second verification signal 136. A gating circuit 138 responsive to the first and second verification signals 124 and 128 applies an enable signal 140 to the enable input 114 to cause the controllable encryption circuitry 10 to provide the encrypted data 106 via the encrypted text output 120. In this embodiment, the encryption circuitry 110 in the second circuit 100 will not operate unless both the first circuit 104 and the disk 108 have been verified. Various techniques are known in the prior art for verifying a disk, such as measuring selected characteristics of a signal recorded thereon (e.g., peak zero crossings, peak jitter, ratio of preselected amplitudes, etc.).

The encryption circuitry 110 implements a suitable cipher, such as the well known symmetric Data Encryption Standard (DES) or the asymmetric Rivest-Shamir-Adleman (RSA) algorithm. The encryption circuitry 110 is preferably implemented using suitable hardware, such as a family of linear feedback shift registers (LFSR) and other digital logic. An example of a hardware implementation of encryption circuitry is provided by Hans Eberle in "A High-Speed DES Implementation for Network Applications," Technical Report 90, DEC System Research Center, September 1992, the disclosure of which is herein incorporated by reference.

Figure 2:
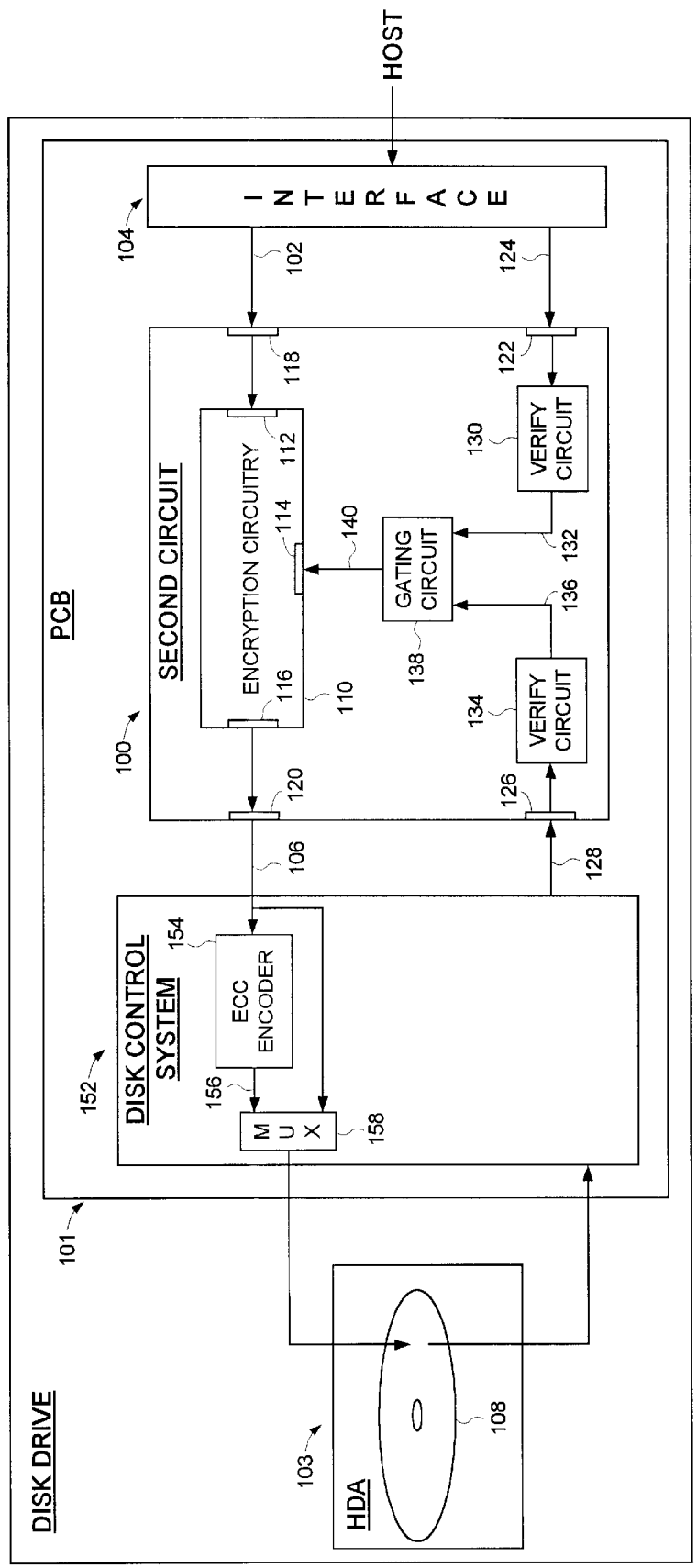
FIG. 2 shows a disk drive according to an embodiment of the present invention wherein the first circuit is an interface circuit connected to receive user data from a host computer and the encrypted data is encoded by an error correction code (ECC) encoder before being stored to the disk.

FIG. 2 shows an embodiment of the present invention wherein the first circuit 104 is an interface circuit connected to receive user data from a host computer. The user data is transferred to the second circuit 100 as the plaintext data 102 to be encrypted. The encrypted data 106 is then transferred to a disk control system 152 comprising an error correction code (ECC) encoder 154. The ECC encoder 154 encodes the encrypted data 106 to generate ECC redundancy symbols 156. The encrypted data 106, followed by the redundancy symbols 156, are transferred via multiplexer 158 to the disk 108. A suitable ECC encoder 154 is the well known Reed-Solomon ECC encoder. In an alternative embodiment, the disk control system 152 comprises a suitable channel encoder for encoding the encrypted data 106 and ECC redundancy symbols 156 according to a channel code, such as the well known run-length limited (RLL) code, and the channel encoded data is stored to the disk 108.

Figure 3:
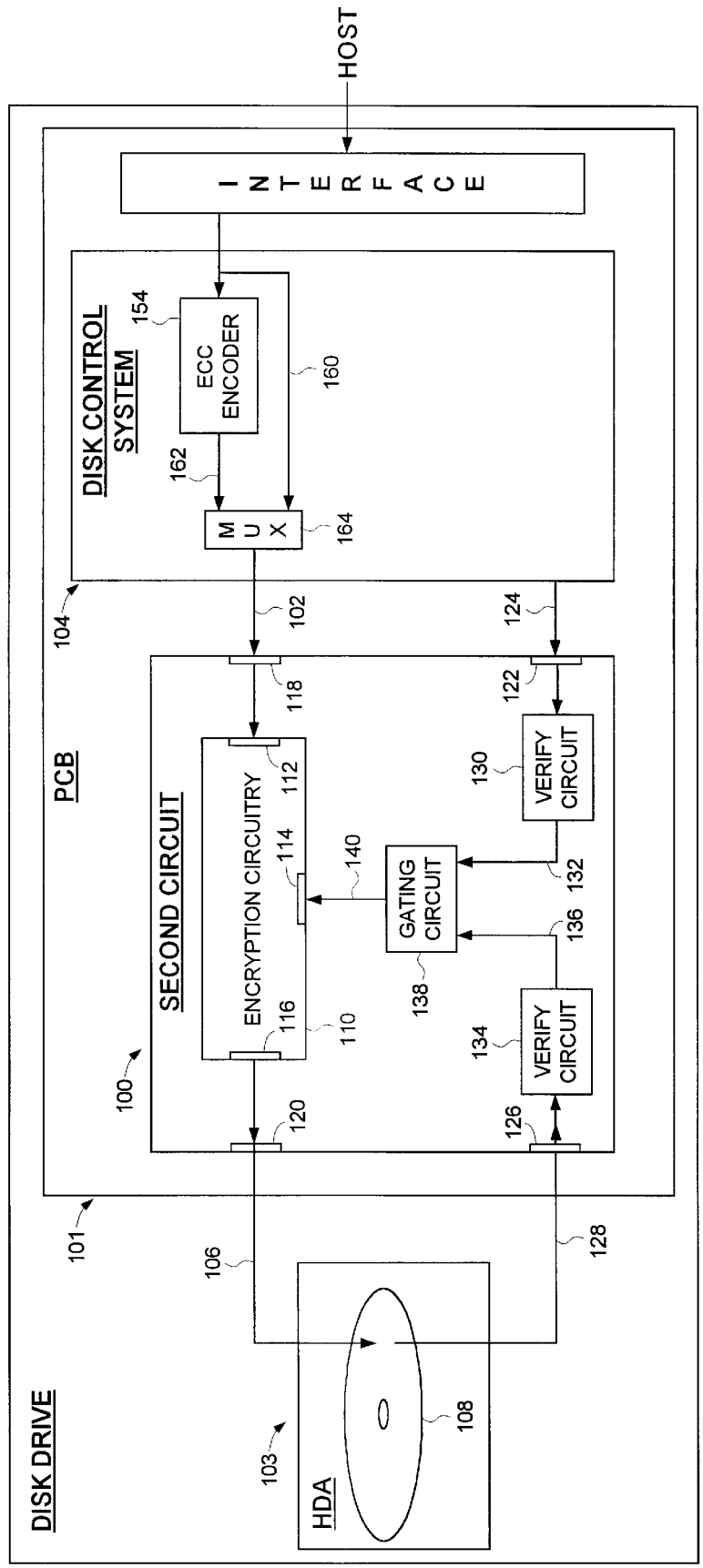
FIG. 3 shows a disk drive according to an embodiment of the present invention wherein the first circuit is a disk control system comprising an ECC encoder for encoding user data into ECC data, and the encryption circuitry encrypts the ECC data to generate the encrypted data.

FIG. 3 shows an embodiment of the present invention wherein the first circuit 104 is a disk control system comprising an ECC encoder 154 for encoding user data 160 received from a host computer into ECC data. The ECC data is transferred to the second circuit 100 as the plaintext data 102 to be encrypted. The ECC encoder 154 encodes the user data 160 to generate ECC redundancy symbols 162. The user data 160, followed by the ECC redundancy symbols 162, are transferred via multiplexer 164 to the second circuit 100 for encrypting. The second circuit 100 encrypts the ECC data (plaintext data 102), and the encrypted data 106 is then stored to the disk 108. In alternative embodiment, the encrypted data 106 is first encoded by a channel encoder (not shown) according to a channel code (e.g., RLL), and the channel encoded data is stored to the disk 108.

Figure 4:
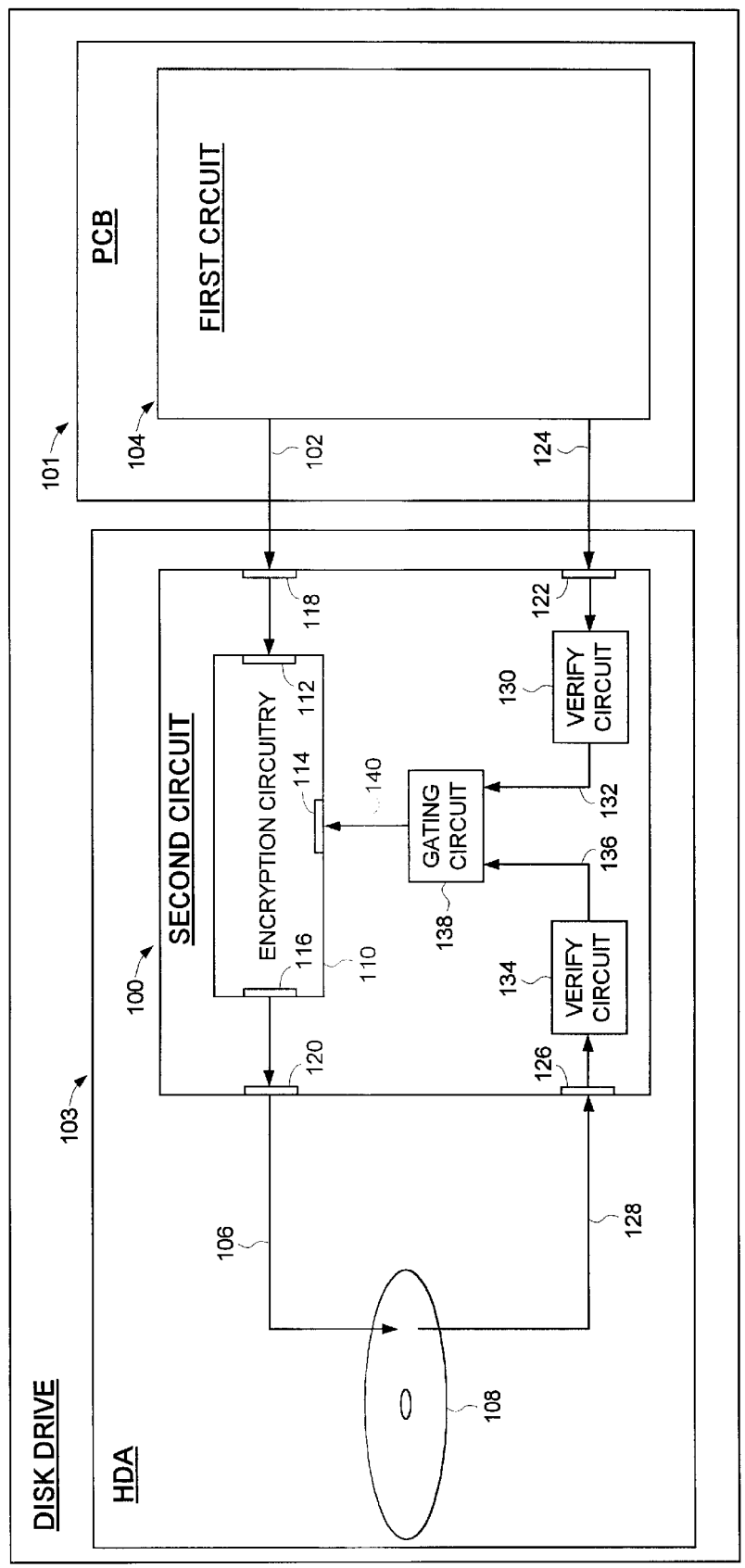
FIG. 4 shows a disk drive according to an embodiment of the present invention wherein the disk and encryption circuitry are sealed within a head disk assembly (HDA).

FIG. 4 shows a disk drive according to an embodiment of the present invention wherein the first circuit 104 is mounted on a PCB 101 and the second circuit 100 and disk 108 are sealed within an HDA 103. This embodiment may provide further protection by detecting when an attacker attempts to tamper with the HAD 103. For example, the HDA 103 may be pressurized and a pressure switch used to detect when an attacker has broken the HDA seal.

Verification

The first circuit 104 in the disk drive of FIG. 1 can be verified by incorporating within the first circuit 104 a unique device identifier which is transferred to the second circuit 100 as the first device authentication signal 124 whenever a request is received from an authenticated client to encrypt plaintext 102. In one embodiment, the first verification circuit 130 within the second circuit 100 comprises a comparator for comparing the device identifier received over line 124 with a corresponding expected device identifier. A match verifies that the first circuit 104 is authenticated and the encryption circuit 110 is enabled. The expected device identifier may be hardwired into the second circuit 100 (including blowing fuses), or it may be stored in non-volatile memory (such as on a disk). According to another embodiment, the expected device identifier can be stored as encrypted text in the first circuit 104 and decryption circuitry employed for decrypting the encrypted text.

Verifying the first circuit 104 using a unique device identifier prevents an attacker from replacing the first circuit 104 with a foreign device, thereby protecting against chosen plaintext attacks using foreign devices. However, an attacker may attempt to inspect or alter the first circuit 104 directly in an attempt to force the encryption circuit 110 to encrypt chosen plaintext. To protect against this type of inspection or alteration, an alternate authentication technique may be employed. For example, as discussed below, the authentication technique can include monitoring variations in spectral characteristics to assist in detecting attempts to inspect or alter the encryption circuit 110 or the first circuit 104.

In an alternative embodiment, a message authentication code (MAC) implemented within the first and second circuits 104 and 100 is employed for generating the first device authentication signal 124 to verify the first circuit 104. Any suitable technique for implementing the MAC may be employed, such as the well known DES implementation. In particular, the first circuit 104 comprises a first device secret key for generating an initial MAC over the plaintext 102 to be encrypted by the encryption circuit 110. The initial MAC is transferred to the second circuit 100 as the first device authentication signal 124. The first verification circuit 130 within the second circuit 100 generates a verification MAC over the plaintext 102 using an internal secret key corresponding to the secret key that was used by the first circuit 104 to generate the initial MAC. The first verification circuit 130 compares the initial MAC (first device authentication signal 124) to the verification MAC where a match verifies that the first circuit 104 is authenticated. In this embodiment, the first device authentication signal 124 (i.e., the initial MAC) may be observable by an attacker, but the secret keys and operation of the encryption algorithm to generate the initial MAC are preferably inaccessible to observation. In this manner, the MAC can deter employing chosen plaintext attacks since the encryption key for generating the MAC over the chosen plaintext must be known in order to generate the first device authentication signal 124.

Referring again to FIG. 1, another embodiment for verifying the first circuit 104 is to measure certain spectral characteristics of the cryptosystem during manufacturing, wherein the initial spectral signature is preferably stored in an inaccessible area of the second circuit 100. During operation, the first circuit 104 generates an operating spectral signature for the cryptosystem which is transferred to the second circuit 100 as the first device authentication signal 124. The operating spectral signature can be transferred as a unique device identifier or included as part of a MAC. The first verification circuit 130 compares the initial spectral signature generated during manufacturing to the operating spectral signature where a match verifies that the first circuit 104 is authenticated. Attempts to inspect or alter the cryptosystem, including attempts to induce errors by heating or irradiating the cryptosystem, will induce detectable changes in the spectral signature which will disable the encryption circuitry 110.

State Machine Control

Figure 5A:
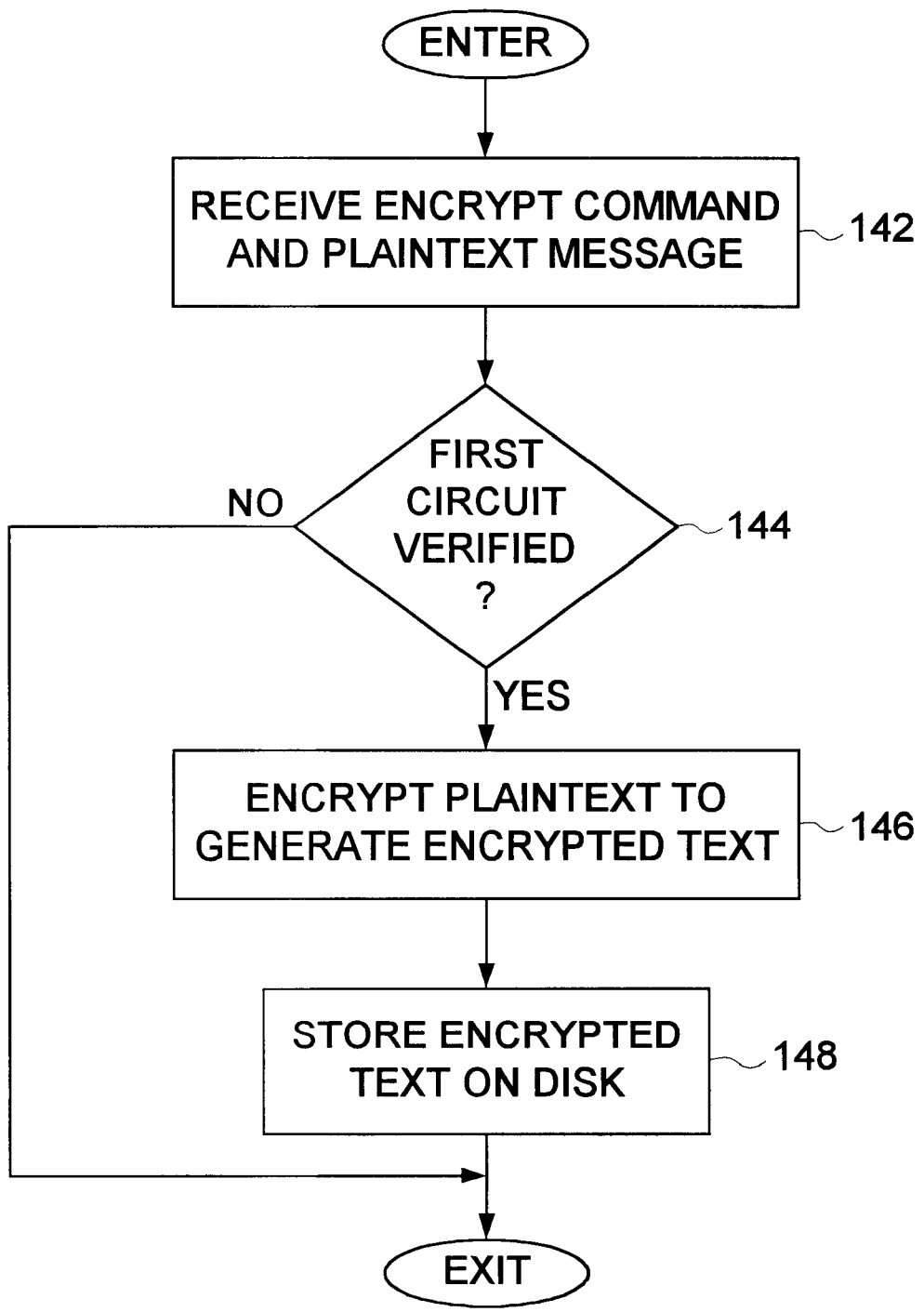
FIG. 5A shows a flow diagram for an embodiment of the present invention wherein the encryption operation is enabled by verifying the first circuit.
Figure 5B:
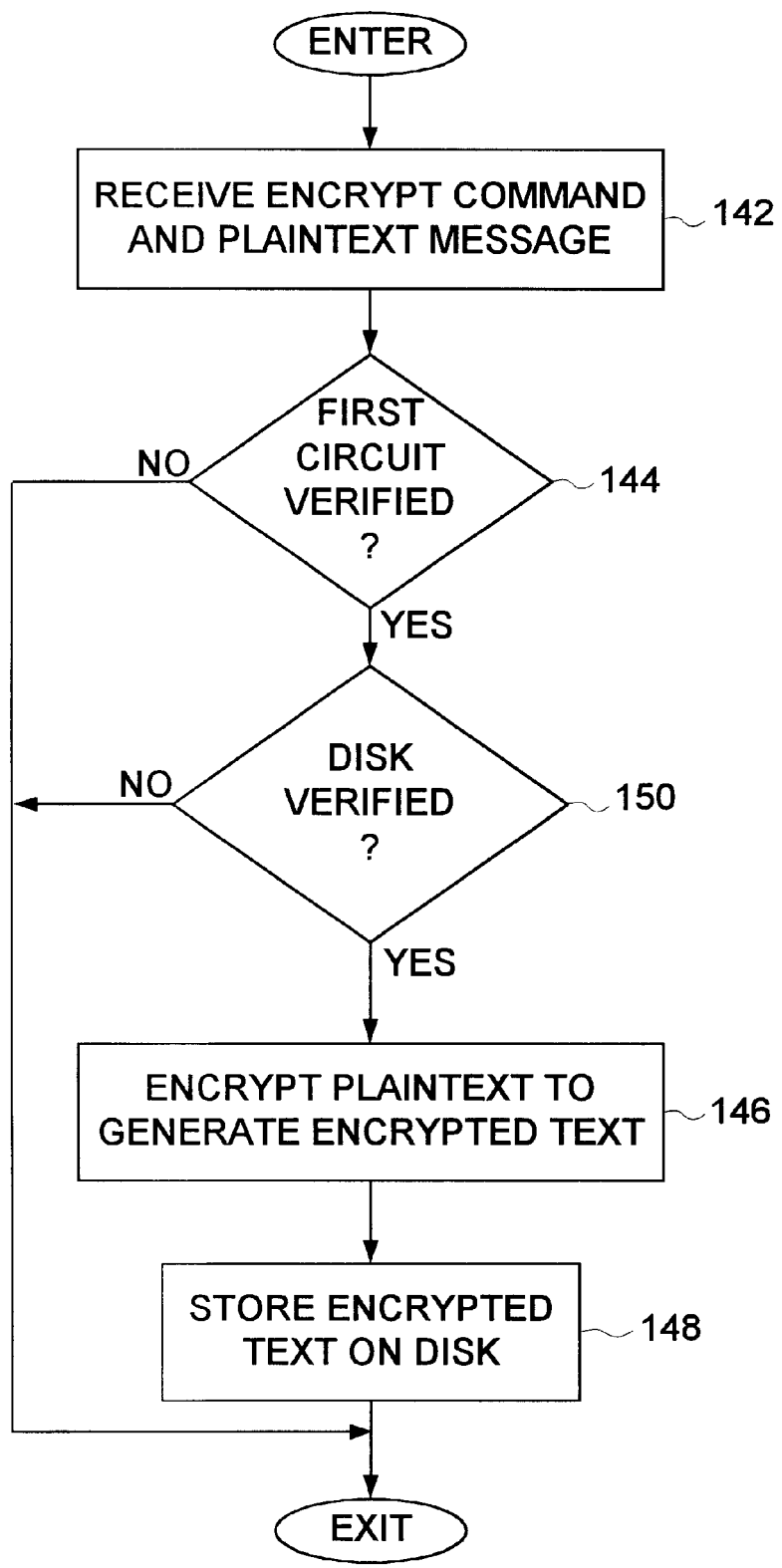
FIG. 5B shows a flow diagram for an alternative embodiment of the present invention wherein the encryption operation is enabled by verifying the first circuit and by verifying the disk, wherein the encrypted data is generated and stored to the disk only if both the first circuit and disk are verified.

In one embodiment, the second circuit 100 comprises state machine circuitry for implementing the device verification used to enable the encryption circuitry 110. The state machine circuitry operates according to the flow diagrams set forth in FIGS. 5A and 5B. At step 142 the state machine receives a command from an authenticated client to encrypt plaintext. At step 144 a branch is executed based on whether the first circuit 104 is verified. Verifying the first circuit 104 may be implemented, for example, as described above. If the first circuit 104 is verified at step 144, then at step 146 the encryption circuitry 110 is enabled by the gating circuit 138 and the plaintext is encrypted. The resulting encrypted data is then stored to the disk 108 at step 148. If the first circuit 104 is not verified at step 144, then the encryption circuitry 110 is not enabled. FIG. 5B shows a flow diagram similar to that of FIG. 5A with the additional step 150 of verifying the disk 108 before gating circuit 138 enables the encryption circuitry 110.

I claim:

1. A disk drive comprising:

a disk for storing encrypted data;

a first circuit for providing plaintext data; and a second circuit comprising:

controllable encryption circuitry for encrypting the plaintext data into the encrypted data, the controllable encryption circuitry comprising:

a data input;

an enable input;

a data output;

a plaintext input for providing the plaintext data to the data input;

an encrypted text output for providing the encrypted data from the data output;

a first control input for receiving a first device authentication signal for authenticating the first circuit; and a first verification circuit, responsive to the first device authentication signal, for producing a first verification signal for use in controlling the enable input of the encryption circuitry to enable the encryption circuitry to provide the encrypted data via the encrypted text output.

2. The disk drive as recited in claim 1, wherein the second circuit further comprises:

a second control input for receiving a second device authentication signal authenticating the disk;

a second verification circuit responsive to the second device authentication signal for producing a second verification signal; and a gating circuit responsive to the first and second verification signals for applying an enable signal to the enable input to cause the controllable encryption circuitry to provide the encrypted data via the encrypted text output.

3. The disk drive as recited in claim 1, wherein:

the first device authentication signal comprises a device identifier; and the first verification circuit verifies the first circuit by comparing the device identifier to a corresponding expected device identifier.

4. The disk drive as recited in claim 3, wherein the expected device identifier is hardwired into the integrated circuit.

5. The disk drive as recited in claim 3, wherein the expected device identifier is stored in a non-volatile memory.

6. The disk drive as recited in claim 1, wherein:

the first device authentication signal comprises a message authentication code generated over the plaintext data using a device key; and the first verification circuit verifies the first circuit by verifying the message authentication code using an internal key.

7. The disk drive as recited in claim 1, wherein the disk and second circuit are sealed within a head disk assembly (HDA).

8. The disk drive as recited in claim 1, wherein the first circuit is an interface circuit connected to receive user data from a host computer.

9. A method of storing encrypted data to a disk, the method comprising the steps of:

receiving plaintext data from a first circuit;

receiving a first device authentication signal for authenticating the first circuit;

producing a first verification signal in response to the first device authentication signal;

enabling encryption circuitry in response to the first verification signal to enable the encryption circuitry to encrypt the plaintext data into the encrypted data; and storing the encrypted data to the disk.

10. The method of storing encrypted data to a disk as recited in claim 9, further comprising the steps of:

receiving a second device authentication signal authenticating the disk;

producing a second verification signal in response to the second device authentication signal; and enabling the encryption circuitry in response to the first and second verification signals to enable the encryption circuitry to encrypt the plaintext data into the encrypted data.

11. The method of storing encrypted data to a disk as recited in claim 9, wherein:

the first device authentication signal comprises a device identifier; and the step of producing a first verification signal in response to the first device authentication signal comprises the step of comparing the device identifier to a corresponding expected device identifier.

12. The method of storing encrypted data to a disk as recited in claim 11, wherein the expected device identifier is hardwired into an integrated circuit.

13. The method of storing encrypted data to a disk as recited in claim 11, wherein the expected device identifier is stored in a non-volatile memory.

14. The method of storing encrypted data to a disk as recited in claim 9, wherein:

the first device authentication signal comprises a message authentication code generated over the plaintext data using a device key; and the step of producing the first verification signal in response to the first device authentication signal comprises the step of verifying the message authentication code using an internal key.

15. The method of storing encrypted data to a disk as recited in claim 9, wherein the disk and encryption circuitry are sealed within a head disk assembly (HDA).

16. The method of storing encrypted data to a disk as recited in claim 9, wherein the first circuit is an interface circuit connected to receive user data from a host computer.

* * * * *